(12) United States Patent
Maslen et al.

(10) Patent No.: US 12,104,738 B2
(45) Date of Patent: Oct. 1, 2024

(54) COMPLETION PLUG SAFETY INDICATOR AND METHOD FOR ITS USE

(71) Applicant: TDW Delaware, Inc., Wilmington, DE (US)

(72) Inventors: Jon Maslen, Sand Springs, OK (US); Roger L. Poe, Beggs, OK (US)

(73) Assignee: TDW Delaware, Inc., Wilmington, DE (US)

( * ) Notice: Subject to any disclaimer, the term of this patent is extended or adjusted under 35 U.S.C. 154(b) by 0 days.

(21) Appl. No.: 18/375,121

(22) Filed: Sep. 29, 2023

(65) Prior Publication Data

US 2024/0110656 A1    Apr. 4, 2024

Related U.S. Application Data

(60) Provisional application No. 63/377,888, filed on Sep. 30, 2022.

(51) Int. Cl.
*F16L 55/11* (2006.01)

(52) U.S. Cl.
CPC ................ *F16L 55/11* (2013.01)

(58) Field of Classification Search
CPC ............................................. F16L 55/11
USPC ................................................. 138/89
See application file for complete search history.

(56) References Cited

U.S. PATENT DOCUMENTS

| | | | | | |
|---|---|---|---|---|---|
| 4,233,913 | A | * | 11/1980 | Herrmann | E05B 65/0075 70/1.5 |
| 4,342,207 | A | * | 8/1982 | Holmes | E05B 65/0075 292/37 |
| 4,369,662 | A | * | 1/1983 | Rieben | F22B 37/003 73/862.01 |
| 4,693,277 | A | * | 9/1987 | Bieber | G21C 13/067 976/DIG. 176 |
| 4,693,278 | A | * | 9/1987 | Wilson | F16L 55/136 220/203.27 |
| 9,091,382 | B2 | | 7/2015 | Gresh et al. | |
| 2005/0241710 | A1 | * | 11/2005 | Early | F16L 55/1283 138/89 |
| 2009/0301568 | A1 | * | 12/2009 | Wilson | F16L 41/04 137/15.01 |

(Continued)

FOREIGN PATENT DOCUMENTS

| | | |
|---|---|---|
| EP | 3161330 A1 | 5/2017 |
| EP | 2015200231 A1 | 5/2017 |
| WO | 2022167843 A1 | 8/2022 |

*Primary Examiner* — David R Deal
(74) *Attorney, Agent, or Firm* — GableGotwals (57) ABSTRACT

A completion system includes a pipeline fitting; a plug body sized for the fitting; a set of blades adapted for securing the plug body within the fitting, the blades having a retracted position and an extended position; a circumferential groove adapted to receive the set blades when in the extended position; and a control bar adapted for use with the plug body. The completion system of this disclosure further includes a sensor and the set of blades is adapted to trigger the sensor when the blades are a properly fully extended to a locking position in the circumferential groove, indicating the plug body is in a properly locked position, and to not trigger the sensor when the blades are not fully extended into the circumferential groove to their proper depth. In some embodiments, the sensor indicates a closed electrical circuit. In other embodiments, the sensor indicates a magnetic flux.

18 Claims, 5 Drawing Sheets

(56) References Cited

U.S. PATENT DOCUMENTS

| | | | |
|---|---|---|---|
| 2012/0192981 A1* | 8/2012 | Kruchoski | G01B 21/08 |
| | | | 138/89 |
| 2013/0186483 A1* | 7/2013 | Gresh | F16L 55/136 |
| | | | 137/320 |
| 2019/0331282 A1* | 10/2019 | Lundman | F16L 55/1283 |
| 2023/0392741 A1* | 12/2023 | Tokuda | F16K 27/003 |

* cited by examiner

COMPLETION PLUG SAFETY INDICATOR AND METHOD FOR ITS USE

CROSS-REFERENCE TO CO-PENDING APPLICATIONS

This application claims priority to, and the benefit of, U.S. 63/377,888 filed Sep. 30, 2022, the content of which is fully incorporated by reference herein.

BACKGROUND

Completion flanges and plugs are used on gas and liquid pipelines as a means of recovering tapping valves after a plugging machine operation. Where used in new construction, the flanges and plugs permit future expansion of the pipeline or piping system. Providing a pressure-tight seal over the tapped holes, the flange eliminates the need for a valve until such time as a valve may be necessary. For example, fittings with flanges and plugs are installed on the line during construction. Later, when branch connections are needed, valves can be installed on the fittings and the plugs removed with a tapping machine. In some applications, the flange entirely eliminates the need for a permanent valve.

In setting completion plugs, a plugging machine connects to the flange of an access fitting to the pipe. The plugging machine includes a control bar with a plug holder that holds a completion plug for insertion into the fitting. During insertion and subsequent setting of the plug, technicians do not have visual access to the plug during the setting operation. Therefore, the plugging process requires manually counting rotations and converting two or more separate actuation methods to linear displacement. Some completion plugs involve feeding a set of blades (leaves or segments) contained in the fitting toward and into a groove of the plug. A non-limiting example of this type of completion plug is a LOCK-O-RING® plug (T. D. Williamson, Inc.). Other completion plugs involve expanding a set of blades (leaves or segments) toward and into a groove of the fitting. A non-limiting example of these other completion plugs is a SHORTPLUG™ plug (T. D. Williamson, Inc.).

A need exists for a check or indicator that lets a technician know with greater certainty that the leaves or segments are properly engaged in the groove and therefore the plug is in the fully set position prior to relieving pressure on the upstream side of the plug.

SUMMARY

A completion system of this disclosure is adapted for use in a pipeline and arranged to move between an open electrical or magnetic circuit and a closed electrical or magnetic circuit that includes a plugging machine and a fitting to the pipeline. In other embodiments of this disclosure, a magnet and proximity switch arrangement is used instead of the electrical circuit.

A completion system of this disclosure includes a fitting; a plug body sized for the fitting; a set of blades adapted for securing the plug body within the fitting, the blades having a retracted position and an extended position; a circumferential groove adapted to receive the set blades when in the extended position; and a control bar adapted for use with the plug body. In embodiments of this disclosure, the completion system includes a sensor and the set of blades is adapted to trigger the sensor when the blades are a properly fully extended into the circumferential groove, indicating the plug body is in a properly locked position, and to not trigger the sensor when the blades are not fully extended into the circumferential groove to their proper depth, indicating the plug body is only partially set or not yet in the locked position, or that one or more of the blades are not in the groove. In some embodiments, the sensor indicates a closed electrical circuit. In other embodiments, the sensor indicates a magnetic flux.

In embodiments, the plug body is used as an electrical switch in circuit relationship with two electrodes. The first electrode includes the fitting and the second electrode includes the plugging machine adapted for use with the fitting. In some embodiments, the plug body is insulated and includes blades having uninsulated surfaces, the plugging machine including an actuator for the blades and the fitting including a circumferential groove. In other embodiments of the completion system, the plug body includes the circumferential groove and the fitting contains the set of blades and an actuator adapted for extending and retracting the set of blades, the fitting including insulated surfaces surrounding the actuator and the set of blades. The circumferential groove includes uninsulated surfaces, and the set of blades includes insulated and uninsulated surfaces. When the set of blades is less than fully extended into the circumferential groove, the plug body is not in the fully set position within the fitting and the uninsulated surfaces of the set of blades and the circumferential groove do not contact one another, thereby forming an open electrical circuit containing the plugging machine, the fitting, and the plug body. When the set of blades is fully extended into the circumferential groove, the plug body is in a fully set position within the fitting and the uninsulated surfaces of the set of leaves and the circumferential groove contact one another, thereby forming a closed electrical circuit containing the plugging machine, the fitting, and the plug body. In embodiments, full contact between the uninsulated surfaces of the blades and groove occurs when there is upward fluid pressure on the plug body.

In other embodiments, a magnet and proximity switch arrangement is used. Each blade of the set of blades includes one or more magnets on or toward a distal end of the blade. A corresponding proximity switch on the fitting is located in line with the circumferential groove (and therefore the blade). When the set of blades is fully extended into the circumferential groove, the plug body is in a fully set position within the fitting and the magnetic flux from the magnet is sensed by the proximity sensor, thereby indicating a closed magnetic circuit containing the plugging machine, the fitting, and the plug body. As with the electrical circuit embodiment, the magnetic circuit embodiment may indicate full contact when the plug experiences upward fluid pressure. Filtering of a kind known in the art, such as a bandpass, may be applied to the magnetic flux signal.

In embodiments of a method of this disclosure for verifying a fully set position of a completion plug body within a fitting connected to a pipeline, the method comprises closing an open electric circuit formed by a first electrode including a plugging machine, a second electrode including a fitting to which the plugging machine is connected, and a switch located between the first and second electrodes, the switch including the completion plug body located within the fitting and insulated from the fitting. Closing of the open electric circuit is by way of extending a set of blades into a circumferential groove located on the fitting or the plug body, an uninsulated surface of the set of leaves coming into contact with an uninsulated surface of the circumferential groove. After the closing, the method includes providing an indicator of the closed electric circuit. In other embodiments of the method, a magnetic circuit is created between the blades and the fitting (or plug) and magnetic flux is monitored.

DETAILED DESCRIPTION

Figure 1:
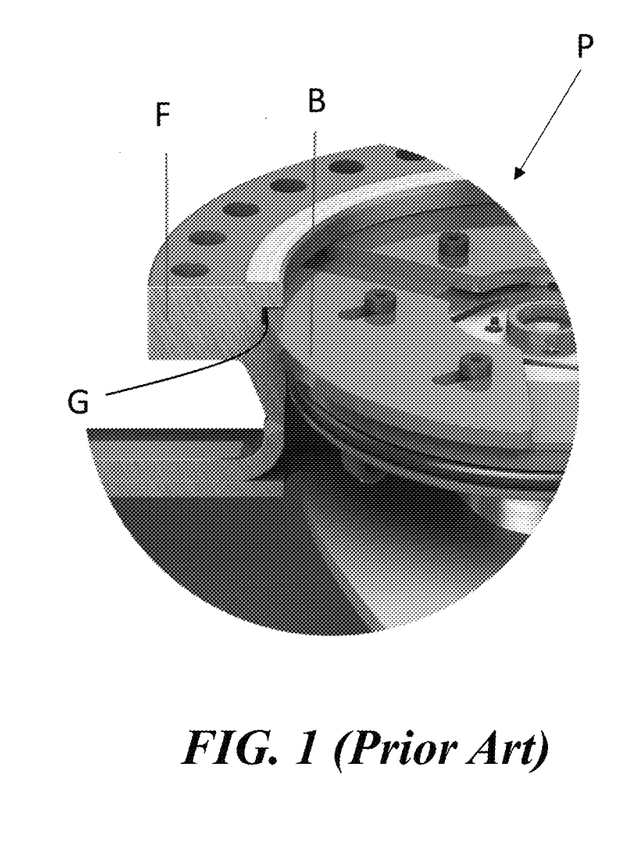
FIG. 1 is an isometric view of a prior art completion plug P having a set of blades B (leaves or segments) that, when actuated by a control bar to an extended position, engage with a circumferential groove G of a fitting F.
Figure 2:
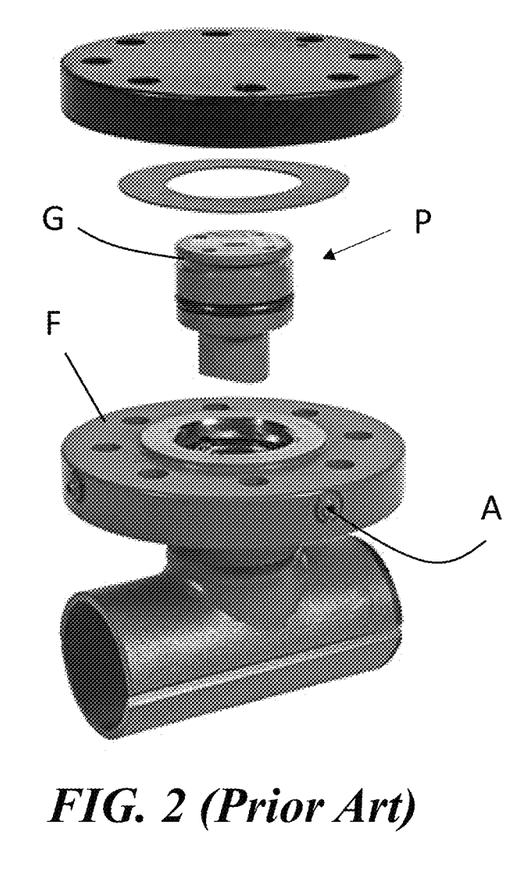
FIG. 2 is an isometric view of another prior art completion plug P that includes the circumferential groove G, the fitting F including an actuator A in communication with corresponding blade of a set of blades (leaves or segments) that are actuated to engage the groove. An example of this type of actuator A and blade B, as modified in accordance with this disclosure, may be seen in FIG. 4.
Figure 3:
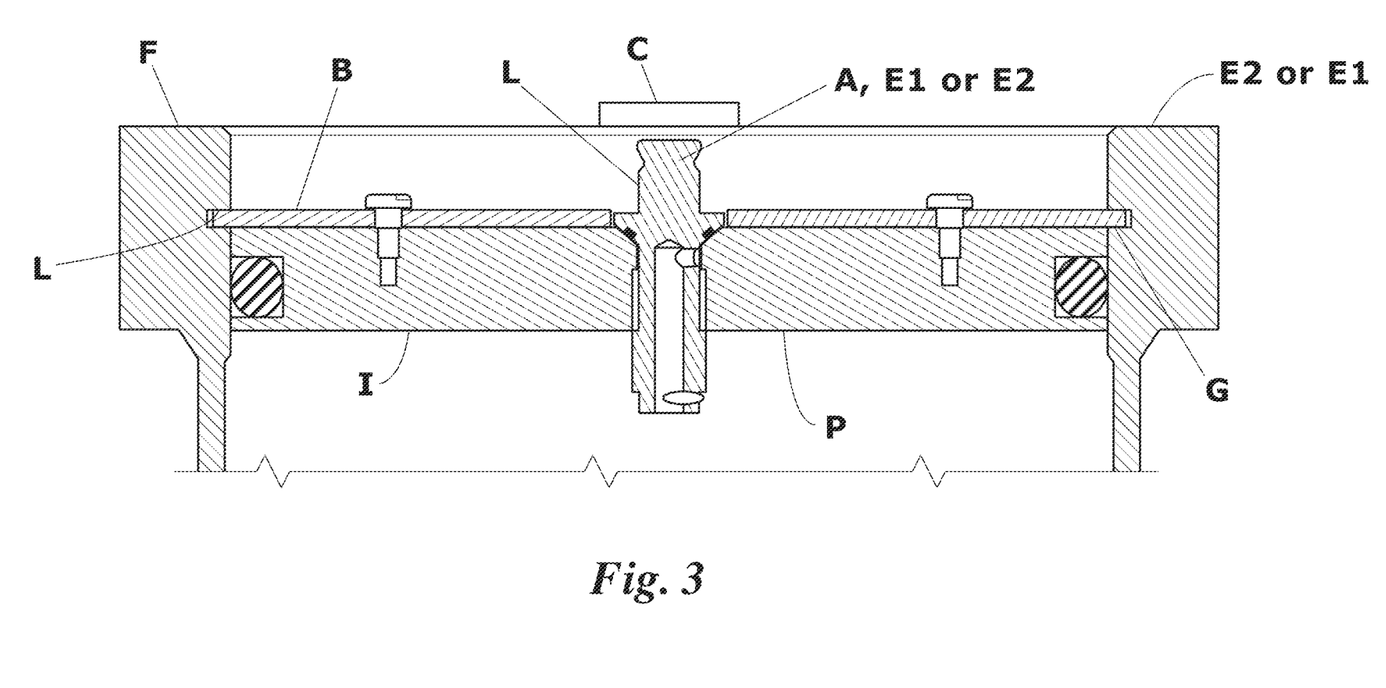
FIG. 3 is an embodiment of a completion system of this disclosure including a plug body P insulated in accordance with this disclosure. The plug is shown disposed within a fitting including a groove to receive the expandable blades (leaves or segments) of the plug. In some embodiments, an insulating coating or plating is applied to those portions of the bottom and sides of the plug that come into contact with the fitting. The non-loadbearing bottom and outer side surfaces of the expandable blades can be insulated. A portion of the control bar in contact with the plug body is also insulated The load bearing contact surfaces remain uninsulated.
Figure 4A:
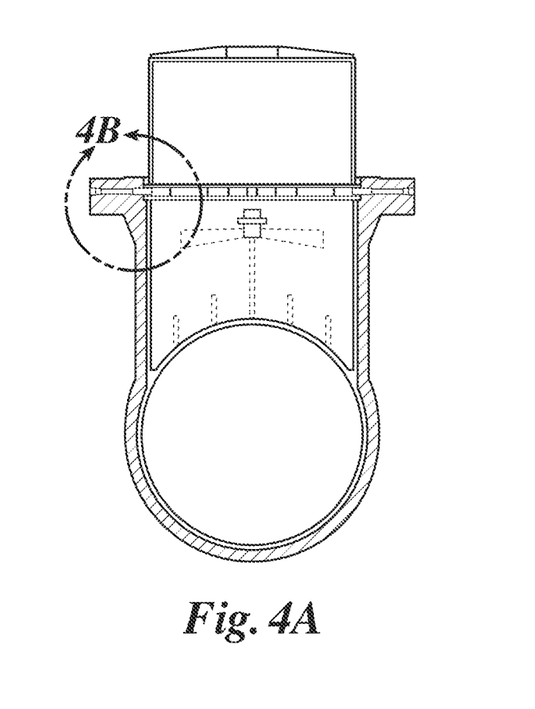
FIG. 4A is another embodiment of a completion system of this disclosure including an insulated plug body. The plug is shown disposed in the fitting. Here the plug includes a groove that receives segments extending toward the plug from the fitting. The passageway or sleeve in which the actuator and blades reside is insulated. Load bearing contact surfaces of the blades are uninsulated.
Figure 4B:
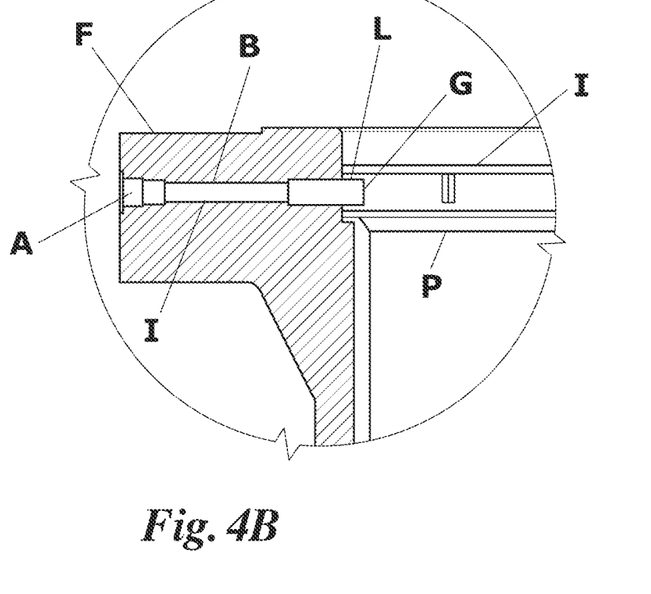
FIG. 4B is an enlarged detail view of section 4B of FIG. 4A.

Referring first to FIGS. 3 and 4, embodiments of a completion system of this disclosure create an electrical circuit between the control bar C of a plug setting machine and the fitting F intended to receive a competition plug P by applying an insulative coating or plating I on portions of the control bar C and the fitting F. In some embodiments, the plug P may create the electrical circuit between the blades B (leaves or segments) and the plug P, with the insulative coating or plating I on portions of the control bar C and blades B. Appropriate safeguards of a kind known in the art can be used to ensure the potential for sparks is reduced or eliminated where the application includes a pipeline carrying a flammable gas or liquid.

This arrangement ensures that continuity is only achieved when the blades B are properly engaged and extended to secure the shear boundary between the plug P and the fitting F when there is upward force applied to the plug P. In other words, the circuit completes only when the plug P is in the fully set position.

For purposes of this disclosure, the fully set position is defined as full extension of the blades B with contact on the top side with the fitting groove G or the fully engaged segments contact the inside groove G of the completion plug P. The control bar C is electrically insulated from the plugging machine body.

A completion plug P of this disclosure, therefore, includes application of an insulative coating or plating I or any combination that limits electrical conductivity between the plug P and the fitting F except when the plug P is in the fully set position. The insulative coating or plating I may be any suitable for use and effective for at least temporarily insulating contacting surfaces of the plug P or fitting F until such time as confirmation of the circuit is complete. For example, in some embodiments, the coating may be a dielectric grease or non-conductive paint. In other embodiments, the coating may be a rubber, plastic, ceramic, TEFLON coating, or the like. An insulated bushing may be used in the fitting F where actuators A extend the blades B or where the control bar C or actuator A connects to the plug P to extend the blades B.

The electrical circuit may be completed using a conductor to contact the control bar C which is then connected to a first electrode. A second electrode is then adhered to the outside of the fitting F using a conductive fastening method. Continuity between the two electrodes may be monitored, for example, using a multimeter or other resistance indicating device. Electrical continuity indicates a connection between the shear load-bearing surfaces of the completion plug P and the fitting F.

In some embodiments, the circuit can be used to power a safety indicator. Once the safety indicator circuit is closed, the technician will know the plug P is properly set and it is safe to begin venting pressure prior to disengaging the plugging machine from the completion plug P.

In systems, devices, and methods of this disclosure the control bar C and plug P are isolated from electrical current leak paths to the pipeline wall except on the upper lip of the blades B (or bottom side of blade groove G) such that continuity will only be established after extending the blades B to engage the groove G inside the fitting F (or plug P). Isolation may be achieved by applying insulative surface coating or plating I to any areas of the completion plug P (or blades B) that contact the inside surface of the fitting F (or plug P) other than the intended load bearing surfaces. This arrangement turns the tool (fitting/plug/actuator) into an electrical switch without need for additional hardware or complex mechanical devices. The uninsulated surfaces of the set of blades may be a load bearing contact surface L. Embodiments of this disclosure may be applied to manual plug setting machines as well as automated plug setting machines. In some embodiments, the actuator A of the control bar C includes uninsulated load bearing contact surfaces L.

The blades B, which may be leaves or segments, include an insulated portion and an uninsulated portion, the uninsulated portion closing the circuit only when the plug P is in the fully set position. For plugs with expanding blades B, the circuit is closed when the (uninsulated) the top side of the blades B come into contact with the fitting groove G, the bottom and sides of the blades B being insulated. For plugs P having a groove G that receives blades B extending from the fitting F, the circuit is closed when the (uninsulated) bottom side of blades B come into contact with plug groove G, the top and sides of the blades, as well as the blade feed screw holes in the fitting F, being insulated. Again, the feed screw holes may be insulated by way of an insulated bushing.

The continuity of the circuit may be indicated to the operator(s) by any combination of direct voltage, resistance, and current measurement; or by observable indicators including but not limited to auditory alarm(s), visual indicator(s) (lights, message monitor, color changing coating; or by motile device (vibration) or thermal response; or some combination of the above.

In experiments conducted by the inventors, a 4" SHORTPLUG™ was covered in an insulative layer except on the top surface of the blades. When upward force was applied to the plug P to simulate a pressure loaded scenario, the resulting contact with the uninsulated surface provided a current path for the applied voltage. Continuity was indicated by visual and auditory alarm using a Fluke-115 Digital Multimeter (<40Ω).

Figure 5:
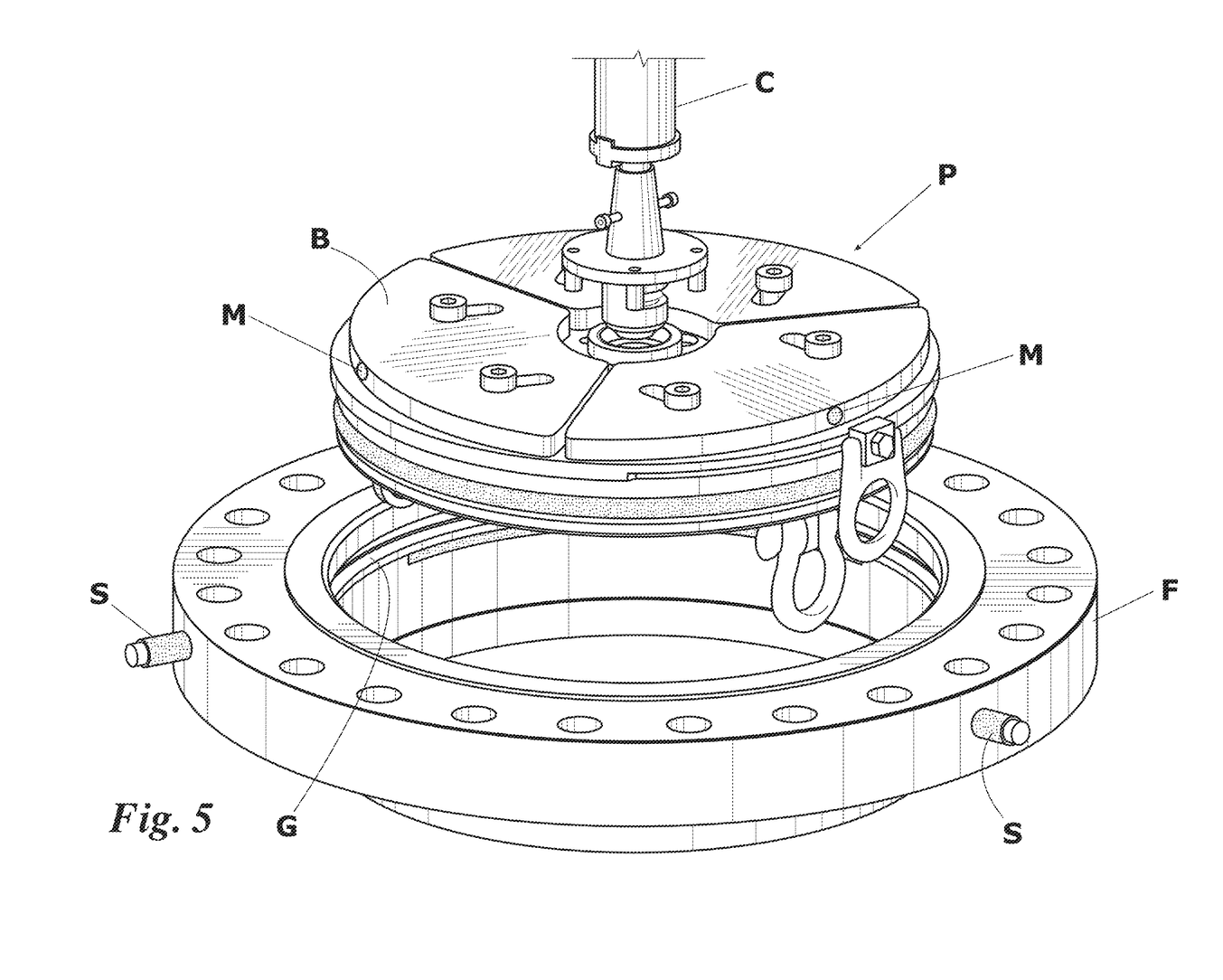
FIG. 5 is another embodiment of a completion system of this disclosure that includes a completion plug body like that disclosed in U.S. Pat. No. 9,091,382 B2 to TDW Delaware, Inc., the contents of which is incorporated herein by reference, and having its blades and fitting modified in accordance with an embodiment of this disclosure. Each blade is adapted to include one or more magnets and the fitting is adapted with a proximity sensor switch in line with the groove. The magnet and proximity switch arrangement also may be adapted for use with completion plugs in which the plug contains the groove and the fitting contains the blades which engage the groove.
Figure 6:
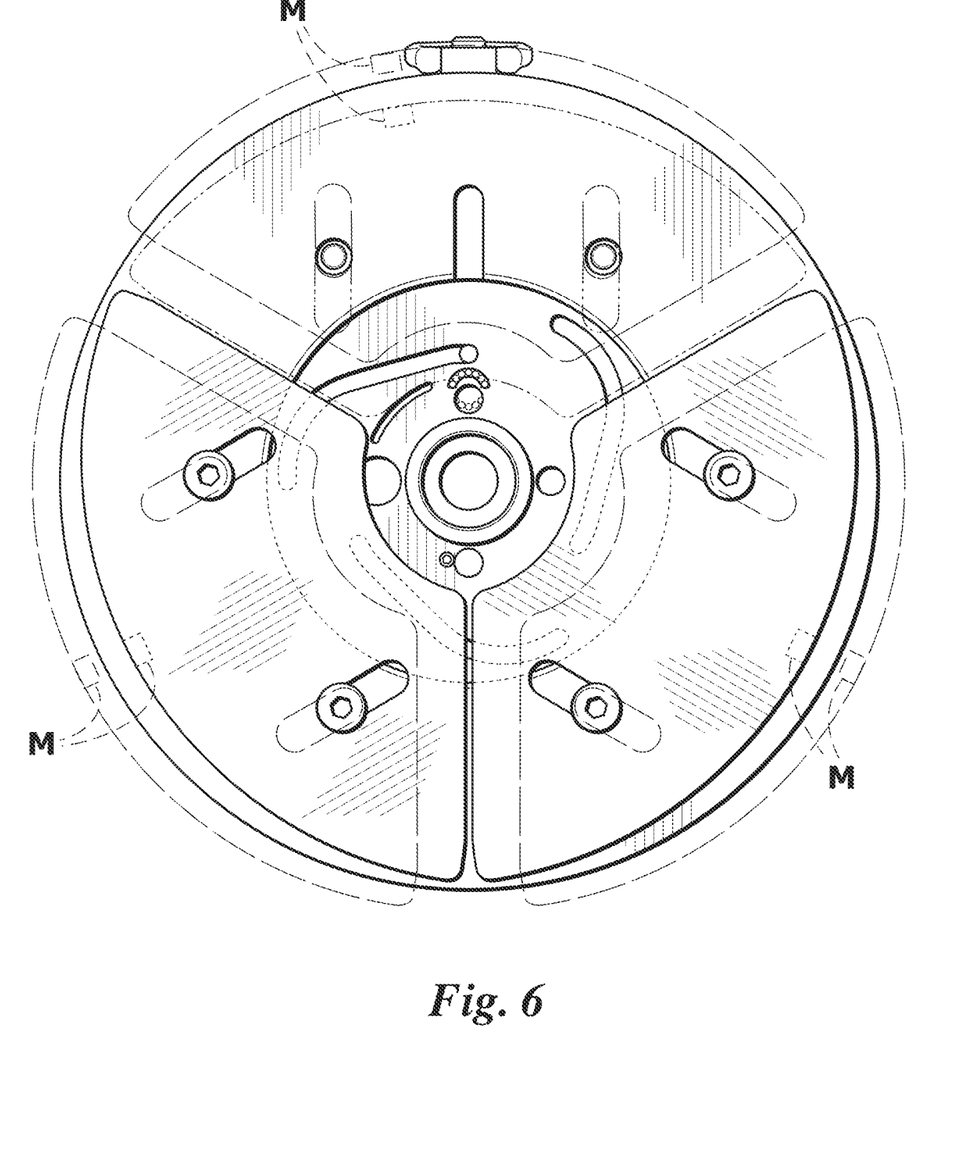
FIG. 6 is a top plan view of the completion plug of FIG. 5, illustrating the blades in their extended and retracted positions.

Referring now to FIGS. 5 and 6, in other embodiments of this disclosure, a magnet M and a magnetic proximity sensor or switch S arrangement is used. Each blade B is adapted to include one or more magnets M and the fitting F is adapted with a proximity sensor or switch S in line with the groove G. The magnet M and proximity switch S arrangement also may be adapted for use with completion plugs P in which the plug P contains the groove G and the fitting F contains the blades B which engage the groove G. Regardless of whether the magnet M or switch S is on the blade B or the fitting F, the magnetic flux from the magnet M is indicated by the switch S when the blades B are in the fully set position, thereby completing the circuit and showing that the blade B are properly in place. The magnet M (or switch S) may be located on a non-load bearing surface of the blade B.

In embodiments, the magnet M may be inserted into a threaded hole toward the distal end of the blade B. To adjust the strength of the magnetic field, the magnet M may be set even with the blade's load bearing surface or recessed relative to it. The proximity sensor S may have a sensitivity such that only when the magnet M is within a predetermined distance from it, the sensor S detects the magnetic field. For example, if the blade B is to be at least ¼ inch (6.35 mm) into the groove G when in the fully extended position, the sensor S only detects the field when the blade B is at that depth. In some embodiments, the sensor S may be position so that it is directly over the magnet M when the blade B is in its fully extended position. The plug body P and blades B may be uninsulated when used with the magnets M and sensor S.

In an embodiment of a method of use, when the operator of the plug setting machine has fully extended the blades B to their proper locking depth within the groove B and contacted the load-bearing surfaces between the fitting F and plug P, an indicator will designate continuity using one or more auditory, visual, thermal, or motion indicator(s). This will provide positive plug setting indication prior to reducing pressure prior to disconnecting the control bar C, thereby improving safety of blowdown procedures by reducing the risk of dynamic loading due to incorrect placement or failure of the blades. The technique could be used in re-entry operations to ensure successful unsetting of the completion plugs prior to retrieval.

While embodiments of this disclosure have been described, a completion system of this disclosure may be modified by persons of skill without departing from the scope of the following claims, the elements of which are entitled to their full range of equivalents.

The invention claimed is:

1. A completion system including a fitting, a plug body sized for the fitting, a set of blades adapted for securing the plug body within the fitting, the blades having a retracted position and an extended position, a circumferential groove adapted to receive the set of blades when in the extended position, and a control bar adapted for use with the plug body, the completion system further comprising:
   a sensor; and
   the set of blades further adapted to trigger the sensor when the set of blades is extended into the circumferential groove at a predetermined locking depth within the circumferential groove.

2. The completion system of claim 1, wherein the sensor is selected to indicate a closed electrical circuit.

3. The completion system of claim 2, wherein
   the plug body includes insulated exterior surfaces;
   a set of blades includes insulated and uninsulated surfaces; and
   the circumferential groove includes uninsulated surfaces.

4. The completion system of claim 3, wherein the uninsulated surfaces of the set of blades includes a load bearing contact surface.

5. The completion system of claim 1, wherein the sensor is selected to indicate a magnetic flux.

6. The completion system of claim 5, wherein the sensor detects the magnetic flux when the magnetic flux is at or exceeds a predetermined threshold.

7. The completion system of claim 5, wherein the sensor is a proximity switch.

8. The completion system of claim 5, wherein one of the fitting or the set of blades includes at least one magnet and another of the fitting or the set of blades includes the sensor.

9. The completion system of claim 8, wherein the at least one magnet is located toward a distal end of at least one blade of the set of blades.

10. The completion system of claim 9, wherein the at least one magnet is recessed relative to a load-bearing surface of the at least one blade.

11. The completion system of claim 1, wherein the plug body includes the set of blades and the fitting includes the circumferential groove.

12. The completion system of claim 11, wherein the control bar includes an actuator adapted to move the set of blades between the retracted and extended positions.

13. The completion system of claim 1, wherein the fitting includes the set of blades and the plug body includes the circumferential groove.

14. The completion system of claim 13, wherein the fitting includes an actuator adapted to move the set of blades between the retracted and extended positions.

15. The completion system of claim 14, wherein the actuator includes insulated surfaces.

16. A method for verifying a fully set position of a plug body within a fitting connected to a pipeline, the plug body and the fitting being components of a completion system comprising a set of blades adapted for securing the plug body within the fitting, the blades having a retracted position and an extended position, a circumferential groove adapted to receive the set of blades when in the extended position, and a control bar adapted for use with the plug body, the completion system further comprising a sensor, the set of blades further adapted to trigger the sensor when the set of blades is extended into the circumferential groove at a predetermined locking depth within the circumferential groove; the method comprising:

monitoring the sensor during a setting of the plug body; and     providing an indicator as to whether sensor has been triggered by the blades.

17. The method of claim 16, wherein the sensor indicates a closed electrical circuit.

18. The method of claim 16, wherein the sensor indicates a magnetic flux.

\* \* \* \* \*